United States Patent
Moulinec (10) Patent No.: US 12,045,685 B2
(45) Date of Patent: Jul. 23, 2024

(54) SYSTEM FOR MONITORING LOADING AND UNLOADING OR AREA TRANSFER OF GOODS

(71) Applicant: VERSA, Saint-Renan (FR)

(72) Inventor: Jacques Moulinec, Brest (FR)

(73) Assignee: VERSA, Saint-Renan (FR)

( * ) Notice: Subject to any disclaimer, the term of this patent is extended or adjusted under 35 U.S.C. 154(b) by 72 days.

(21) Appl. No.: 17/787,447

(22) PCT Filed: Jan. 21, 2020

(86) PCT No.: PCT/EP2020/051443
§ 371 (c)(1),
(2) Date: Jun. 20, 2022

(87) PCT Pub. No.: WO2021/148112
PCT Pub. Date: Jul. 29, 2021

(65) Prior Publication Data
US 2023/0030447 A1     Feb. 2, 2023

(51) Int. Cl.
*G06K 7/10* (2006.01)
*G06Q 10/087* (2023.01)

(52) U.S. Cl.
CPC ..... *G06K 7/10445* (2013.01); *G06K 7/10732* (2013.01); *G06K 7/10792* (2013.01)

(58) Field of Classification Search
CPC ........... G06K 7/10435; G06K 7/10445; G06Q 10/087
USPC ........................................................ 235/438
See application file for complete search history.

(56) References Cited

U.S. PATENT DOCUMENTS

| | | | |
|---|---|---|---|
| 5,609,223 A | 3/1997 | Izaka et al. | |
| 6,328,154 B1* | 12/2001 | Huber | B65G 43/04 198/782 |
| 7,155,304 B1 | 12/2006 | Charych | |
| 2003/0019930 A1 | 1/2003 | Hecht | |
| 2014/0297023 A1* | 10/2014 | Benjamin | B66F 9/10 700/213 |
| 2017/0228885 A1 | 8/2017 | Baumgartner | |
| 2018/0374039 A1* | 12/2018 | Walden | G06Q 10/0875 |

FOREIGN PATENT DOCUMENTS

JP       H06100117 A    4/1994

* cited by examiner

*Primary Examiner* — Toan C Ly
(74) *Attorney, Agent, or Firm* — H&I PARTNERS; Chai Im; C. Andrew Im (57) ABSTRACT

A system for monitoring loading and unloading of goods or area transfers of goods. A terminal is positioned close to the point of passage of the goods. The goods being in containers, each container includes a barcode or a container carrier having a barcode. The terminal includes an image capturing device, configured to capture a photograph or film at the time when at least one container or container carrier passes in front of the terminal. A flash connected to the image capturing device triggers when a photograph or film is captured. A control unit includes a microcontroller driving the system and the database. A processing unit to process the photograph or film to identify the barcode captured in the photograph or film. A triggering unit to trigger the capture of a photograph or film based on at least detection of a container indicating passage in front of the terminal.

9 Claims, 9 Drawing Sheets

SYSTEM FOR MONITORING LOADING AND UNLOADING OR AREA TRANSFER OF GOODS

RELATED APPLICATIONS

This application is a § 371 application of PCT/EP2020/051443 filed Jan. 21, 2020, which is incorporated herein by reference in its entirety.

TECHNICAL FIELD OF THE INVENTION

The present invention relates to a system for monitoring loading and unloading or movement of goods. It applies, in particular, to all companies, public or private bodies using the transport of goods in handling or packaging units or any other container that could be handled in the same way as a container support such as a pallet (handling by pallet truck).

The term "container support" or "pallet" used in this document covers any type of goods contained, or not, in containers that could be handled by a fork handling machine (manual or electric pallet truck, forklift, stacker truck, etc.), it may consist of wooden pallets, plastic pallets, metal pallets, pallet boxes (wood, plastic, cardboard, mesh).

BACKGROUND OF THE INVENTION

One of the aims of the invention is to automatically trace the movements of goods during the loading and unloading phase.

A prior technique consists in using a laser beam barcode reader. The drawbacks of this technique are that the reading area must be less than 1 meter high, the barcode reading is not reliable (about 30% of unread barcodes) and there is no proof of loading or unloading.

Another technique consists in using a mobile terminal with a PDA-type barcode reader (standing for Personal Digital Assistant, also called organizer). The drawbacks of this technique are that it is not guaranteed that the identification of the container support is done before loading (the container support might be loaded and not identified), it is necessary to take a break to identify the goods support, and also there is no proof of loading or unloading.

SUMMARY AND OBJECT OF THE INVENTION

The invention may be extended from the automatic traceability of the movements of goods during the loading and unloading phase, to the movements of goods during their movements from one warehouse to another, and to the movements of stocks in general.

The present invention aims to overcome these drawbacks with a completely innovative approach.

To this end, the present invention relates to a system for monitoring loading and unloading or area transfer of goods including a terminal positioned proximate to the point of passage of the goods, said goods being in containers or on container supports, each container includes a barcode or a container support includes a barcode, said system being remarkable in that the terminal includes:

an image capturing device, of the video camera or photo camera type, configured for capturing a photo or film when at least one container passes in front of said terminal, said terminal extracts and decodes the identification barcode of the container(s) before sending said photo or said film to a database;

a flash connected to the image capturing device triggered when capturing photos or films;

a control unit, including a microcontroller driving the system and said database, a unit for processing the photo or film to identify the barcode captured as a photo or film, a unit for triggering the photo or film capture as a function of at least:

a first cell for detecting at least one container, the first detection cell including a first diffusion sensor and a second diffusion sensor indicating a passage in front of the terminal, a second detection cell, the second detection cell having a first reflection sensor and a second reflection sensor, cooperating with a reflector positioned on the container(s) or the container support(s) or a device for handling the container support indicating the presence of at least one container at the terminal.

The diffusion sensors are installed in a single terminal, with the emitter and the receiver being both in the same housing. The diffusion sensors use the reflection of the target object within the predetermined detection range. The emitter sends a continuous light beam. Once it hits the target, it is scattered in all directions. A portion of this light returns back and is recognised by the receiver which then sends an electric signal to the output. In one variant, diffusion sensors with background suppression are used which involve an adjustable detection distance. In this case, the objects with a reflective background are ignored to ensure that only the objects within the detection distance are detected. Afterwards, the information is processed by the control unit.

Thanks to these arrangements, the system allows automatically tracing the movement of goods or goods containers or the same:

Automatic identification of the containers or container supports entering a warehouse or any site using products packaged in containers or container supports, in particular during truck unloading or area (buffer, stock, etc.) transfer of goods.

Automatic identification of the container supports leaving a warehouse or any site using products packaged on a container support, in particular during truck loading.

Automatic identification of the container supports transiting inside a warehouse or any site using products packaged on a container support (automatic capture of transfer movement from one stock to another, or from one area to another on the same site or from one site to another).

Thus, the system is reliable in identifying everything on a container carrier passing nearby. By nearby, it should be understood a distance of less than 20 m.

Automatic identification consists in performing the following operations:

Automatically read the identification barcode of the container or of the container support without stopping the machine handling the container support (pallet truck, handling carriage, etc.), there is continuous reading.

Keep one or several photos or films (and the date) of the container or of the container support with the container upon its passage in front of the system.

The system allows identifying with certainty and proof by photo or film the movements of containers or container supports performed in the context of specific operations (loading/unloading of a truck, stock transfers, area transfers, etc.).

The system allows detecting with certainty and proof by photo or film the movements of multiple containers or container supports pushed one behind the other or superimposed on top of each other.

The reflective sensors are installed in a terminal and the emitter and the receiver are in the same housing. Hence, all it needs is to simply position the reflector opposite the sensor. In the present case, the reflector is positioned on the handling machine. The principle is that a detection occurs when the light beam between the emitter and the receiver is received. The reflector sends back the light beam to the sensor when an object is present which allows receiving the beam and makes the sensor send an electric signal to the output. Afterwards, the information is processed by the control unit.

Thus, the system is easily installed anywhere in a warehouse or workshop: no need for square meters to install a terminal. For example, it is possible to fasten the terminal on the dock for its set-up. In one variant, it is possible to have a terminal with castors to facilitate its movement and to fix the wheels by a locking system to monitor the loading and unloading, or transfer from one storage area to another.

Indeed, most of the systems of the prior art set a rigid infrastructure with human protection (in fact a machine in which the pallets or packages pass), and go so far as to make the passage of the pallets or packages rigid. As for us, with the system of the present invention, it is possible to install it on the current flow of goods without stiffening it. Thus, the system does not impose a rigid path on container supports and containers on a conveyor, on a conveyor belt, or in a machine with protections.

The system of the present invention also allows identifying containers (packages) and container supports (pallets) and their characteristics at a distance larger than 40 cm and up to several meters (which again allows for flexibility in the material flows, and allows for agility and flexibility to material flows).

On the contrary, the systems of the prior art are systems that have sensors a few centimetres from the packages or pallets to detect them.

The system of the present invention allows flashing a moving container support. In one embodiment, it has been tested to identify container supports at 12 km/h without any problem in reading the photo or film which could be read perfectly.

Since the system of the present invention is flexible, it also does not impose a maximum width or length of the loaded packages. On the contrary, in the systems of the prior art, there is a maximum dimension in which packages or pallets fit.

The system of the present invention is compatible and adaptable to each installation context (nature of sensor recognition, nature of the physical measurement elements), for example with or without the use of RFID, with or without the use of cameras, with or without the use of barcode readers, with or without the use of a photo or video camera.

The invention is advantageously implemented according to the embodiments and variants disclosed hereinafter, which should be considered individually or according to any technically feasible combination.

In one embodiment, for loading or area transfer the photo or film capture triggering unit captures the photo or film if the first diffusion sensor indicates the presence of a passage in front of the terminal to the control unit, then the second diffusion sensor indicates a passage in front of the terminal to the control unit.

Thus, it is necessary to have feedback from the two sensors in this order to trigger the photo or film capture, because it consists of loading or area transfer (entry or exit).

In one embodiment, for unloading or area transfer the photo or film capture triggering unit captures the photo or film if the second diffusion sensor indicates a passage in front of the terminal, then the second reflection sensor indicates the presence of at least one container or container support, then the first diffusion sensor indicates a passage in front of the terminal, then the first reflection sensor indicates the presence of at least one container or container support.

Thus, it is necessary to have feedback from four sensors in this order to trigger the photo or film capture, because it consists of unloading or area transfer. This avoids untimely photo or film captures, if for example the operator leaves the truck without loading.

In one embodiment, it includes at least one system information screen.

In one embodiment, it may include a second system information screen intended for the operator or his management providing him with quantitative and qualitative information on the status of the unloading or loading. (State of progress, compliance with safety and passage instructions, deadlines, times, percentages, etc.)

For example, the screen allows showing the photo or film captured during the loading and unloading or area transfer of a container or a container support.

In one embodiment, a terminal is located on each side of the point of passage of at least one container or container support.

In one embodiment, above the point of passage of at least one container or container support there is a first depth sensor adapted to measure at least one height distance of the container(s) between said first sensor and the container(s).

In one embodiment, a second depth sensor and a third depth sensor are located on either side of the point of passage of at least one container or container support, the second depth sensor and the third depth sensor being adapted to measure at least one lengthwise and widthwise distance of at least one container or container support between the second sensor and the container(s) or container support, or the third sensor and the container(s) or container support.

Thanks to these arrangements, the system allows automatically determining the air volume of the containers on the container support (maximum external dimensions: length, width, height), without stopping the machine handling the container support.

During the volumetric measurement, it is necessary to have information on the direction of the machine handling the container support to remove the volume of the handling machine and/or the container support and the person handling the machine. Thus, the different measurement sensors will measure all of the containers and will be able to rebuild the volume of the set in three dimensions.

The control unit will process the information derived from the different sensors to subtract the person handling the machine and the handling machine so that only the volume of the containers remains.

The processing of information derived from the sensors is possible by knowing the way and direction of the container support, which facilitates the calculation of the volume to allow reliably identifying the handling machine and the person handling it.

In one embodiment, said system includes a communicating terminal having an image capturing device and an element for sending said images to said database.

Thus, the communicating terminal is, for example: a digital tablet, a mobile phone, in particular of the "smartphone" type, a smart watch, connected glasses, a headset, a computer, or a virtual reality headset, or a digital screen in any forms.

Thus, there is additional proof of loading or unloading or area transfer.

In one embodiment, the image capturing device includes timestamp information, the timestamp information including at least the date and the time of the image capture, said timestamp information being transmitted to the database by the processing unit.

The timestamp information is correlated to the operation of loading or unloading or area transfer of the considered containers or container supports.

In addition to the photo or film, the time and the date allow certifying and proving what is visible at this time point.

BRIEF DESCRIPTION OF THE FIGURES

Other advantages, aims and features of the present invention appear from the following description provided, for explanatory and non-limiting purposes, with reference to the appended drawings, wherein.

DESCRIPTION OF THE EMBODIMENTS

Definitions

Detection cells: optoelectronic system enabling object detection either by direct reflection (light emitted by the cell reflected directly by the object to be detected) or through the use of a specific reflector (light emitted by the cell returned back exclusively by a specific reflector).

Warehouse, stock, area: physical location where products are stored (in particular pallets or packages or the same) temporarily or permanently, for a short period or a long period.

WMS: standing for Warehouse Management System, a registered trademark, a warehouse management software TMS: standing for Transport Management System, a registered trademark, a transport organisation software including the management of a site for loading or unloading trucks (planning for the allocation of docks for the flow of trucks passing through the site).

ERP: Enterprise Resource Planning, a registered trademark, an integrated management software for companies, can integrate a WMS or a TMS.

Loading or unloading dock: a location where the trucks are positioned to load or unload products, the docks are at the same height as the trailers of the trucks, a mobile platform allows adjusting the few centimetres of a gap between the trailers and the floor of the warehouse, handling machines can then enter and leave the truck naturally.

Programmable automaton or micro-automaton or control unit: an industrial real-time programmable device enabling the connection of external equipment such as detection cells, lights.

Carriage: a handling machine enabling handling of "pallets" or "container support".

Embodiments

Figure 1:
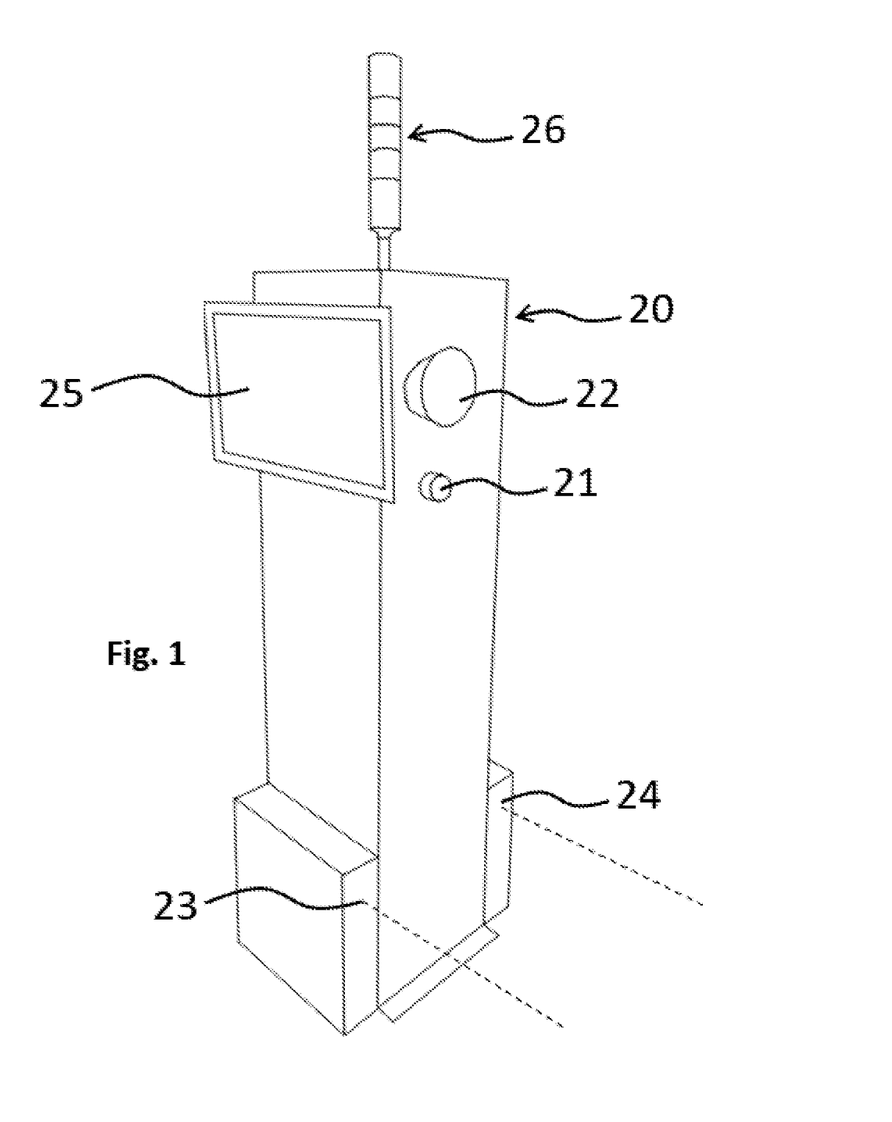
FIG. 1 represents a diagram of a terminal of the system for monitoring loading and unloading or area transfer of a container support object of the present invention.

FIG. 1 represents a terminal 20 of the system for monitoring loading and unloading of a container support. The terminal 20 is represented at a height of about 1.50 m and is placed proximate to the point of passage of the container supports (loading/unloading dock of a warehouse, stock entry/exit doors).

The system mainly integrates a camera (image capturing device, 21), a flash 22, a computer or microcontroller or automaton or else control unit, cells for detecting the containers or container supports. The first container or container support detection cell includes a first diffusion sensor 23 and the second container or container support detection cell includes a second diffusion sensor 24. A screen 25 is located at the terminal 20 enabling the display of information. A passage light indicator 26 (lights) is located above the terminal 20.

The system ensures the following functions:
Photo or film capture from different angles at the time point of passage of the container(s) or container supports, allowing their volume rebuild and their identification or the visualisation of their state at this time point.
Recovery of the identification barcode of the container(s) or container supports by image analysis.

Computer exchange with warehouse management software (ERP, WMS, TMS) of the client for validation of the movement of the container support or container.

Archiving of photos and films for proof of shipment/receipt.

Loading or unloading, area entry and exit, discrimination to avoid untimely triggering of photos or films (empty passage, passage of an operator alone).

One of the problems solved by the invention consists in guaranteeing triggering of one or several photo(s) or film(s) at the exact time point of the passage of the container or the container support in front of the terminal 20.

Container or Container Support Loading Mode
(Forward Motion of the Handling System)

For this case, the original idea consists in using two cells for detecting the container or the container support (direct reflection) allowing determining the direction of passage (one cell and then the other), measuring the time between the two detections, calculating the speed of passage and triggering the photo or film at the time point of passage of a container or of the container support. Moreover, the use of a third sensor enables the calculation of the acceleration in addition to the speed.

Upon leaving the empty carriage (without a container support), the cells detect the order of passage and inhibit triggering of the photo or film.

The cells are positioned about 30 cm from the ground so as to be able to detect the lowest container or container support.

Figure 2:
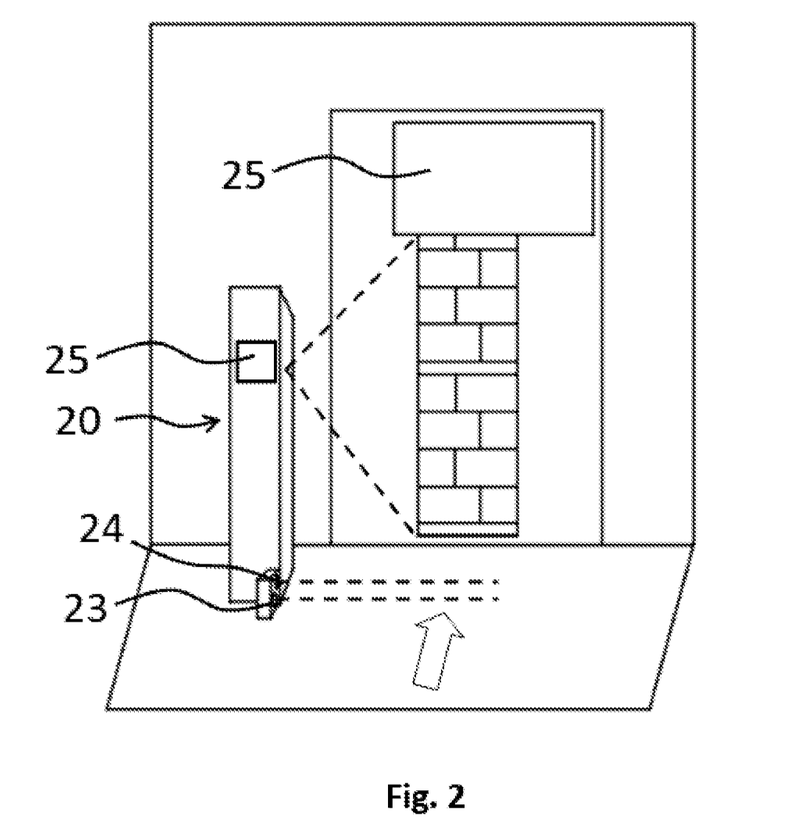
FIG. 2 represents a diagram of the passage of a container support in front of a terminal of the system for monitoring loading and unloading or area transfer of a container support object of the present invention.

FIG. 2 represents a diagram of the passage of a container support in front of a terminal 20 of the system for monitoring loading and unloading or area transfers of a container support.

The implementation of the system is achieved by the installation of terminals 20 at the level of the truck loading dock, it also consists in the installation of terminals 20 at the level of doors for accessing stocks (example: products or goods leaving production on a container support or a container and then stored in a warehouse integrated into the site, the transfer is done by means of a forklift).

The terminals may be fixed to the ground, or on a movable support in the stop position when triggered or fixed to the ceiling without occupying any surface on the ground, or fixed to a wall or a fixed support type allowing supporting them in a stable and stationary manner at the time point of the trigger(s).

The geometry of the overall system may be split in order to comply with the geometry of the passage of the containers or container supports This figure shows a single terminal 20 which is installed at each checkpoint (requires the presence of the label on a container or a container support always on the same side). A screen 25 is located on the terminal 20 and another one which is positioned above the loading or unloading dock. The large-sized screen 25 is offset in height and allows feedback to the operator.

The two dotted lines represent the cone of view of the image capturing device 21.

The arrow indicates the direction of passage of the container support.

If the position of the label (barcode) on the container support is uncertain, two terminals 20 installed on each side of the checkpoint (a "master" terminal+a "slave" terminal) are positioned. If the labels are placed on another visible face (top or front), an additional terminal of a terminal is provided above or opposite the passage.

FIGS. 3 to 7 represent diagrams of the passage of the container support in front of a terminal 20 of the monitoring system when loading a container support. In these figures, the terminal 20, a first diffusion sensor 23 and a second diffusion sensor 24 are represented.

Figure 3:
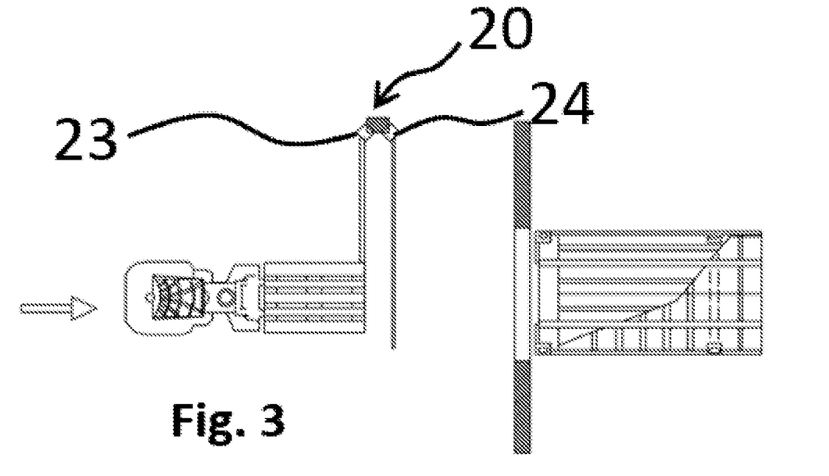
FIG. 3 represents a loading step and more particularly the arrival of the container support in front of the identification area.

FIG. 3 represents the arrival of a container support in front of the identification area.

The detection is performed by the first cell which includes the first diffusion sensor 23. The latter is cut off by the passage of the container support.

Figure 4:
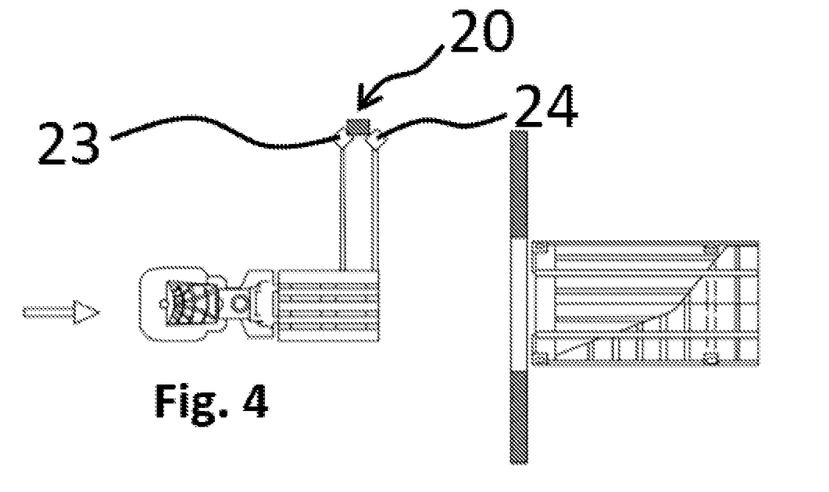
FIG. 4 represents a loading or area transfer step and more particularly represents the arrival of the container support in front of the area for identification and detection by the second cell.

FIG. 4 represents the arrival of the container support in front of the identification and detection area by the second cell.

The detection is performed by the first detection cell which includes the first diffusion sensor 23 and the second diffusion sensor 24. The detection is then performed by the first diffusion sensor 23 which is cut off by a passage in front of the terminal, then the second diffusion sensor 24 which is also cut off by a passage in front of the terminal.

The control unit processes the information on live and calculates the speed of movement of the container support. The speed information is then processed by the photo or film capture triggering unit to trigger the photo or film at the right time point. The photo or film is captured if the first diffusion sensor 23 indicates a passage in front of the terminal 20 to the control unit, then the second diffusion sensor 24 indicates a passage in front of the terminal 20 to the control unit. In another variant, the photo or film is captured according to the speed of progress of the container support and if the first diffusion sensor 23 indicates a passage in front of the terminal 20 to the control unit then the second diffusion sensor 24 indicates a passage in front of the terminal 20 to the control unit.

Figure 5:
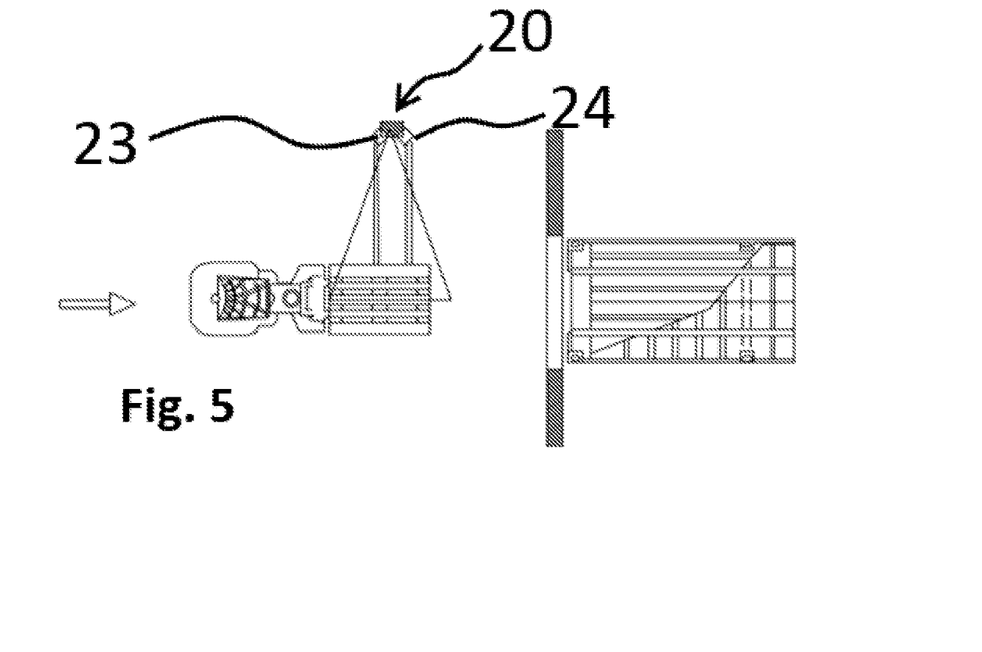
FIG. 5 represents a loading or area transfer step and more particularly the triggering of the photo or film centred on the container support.

FIG. 5 represents triggering of the photo or film centred on the container support.

A cone is visible which represents the capture by the image capturing device 21. The photo or film capture triggering unit triggers the photo or film capture when the container support is at the middle of the cone represented in the figure. The middle is known by the speed of movement of the container support. The dimensions of the container support are known, the capture of a photo or film is triggered slightly (according to the speed) after the outputs of the first diffusion sensor 23 and the second diffusion sensor 24 indicate a passage in front of the terminal 20. The cut off order of the first diffusion sensor 23 then of the second diffusion sensor 24 clearly indicates loading and therefore the capture of a photo or film for loading or area transfer.

Figure 6:
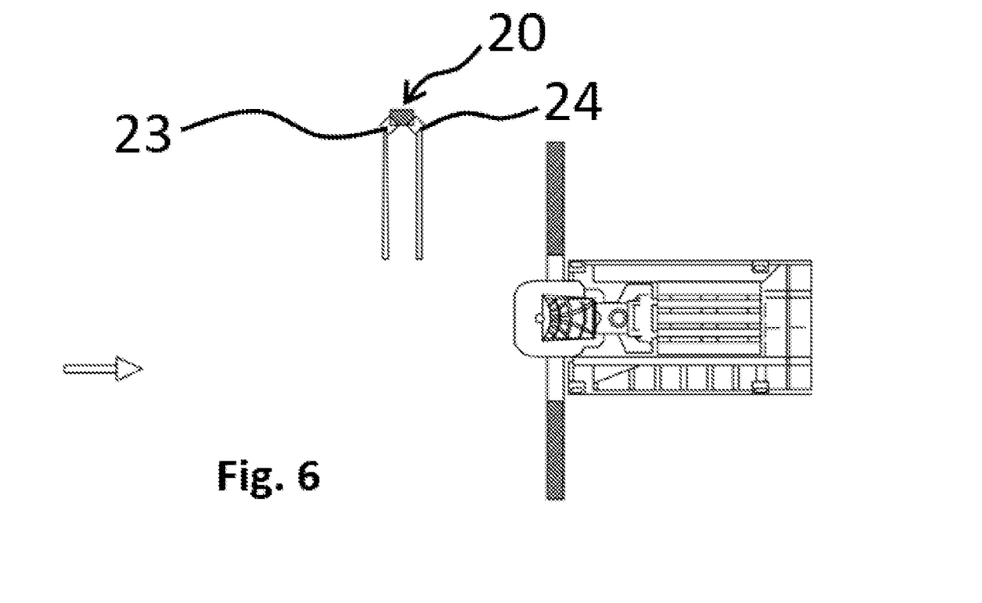
FIG. 6 represents a loading or area transfer step and more particularly the loading of the container support in the truck, or the entry into an area.

FIG. 6 represents loading of the container support into the truck or transfer into the area. In this figure, the container support is loaded into the truck. The first diffusion sensor 23 and the second diffusion sensor 24 not being cut off by the container support or by its handling machine.

Figure 7:
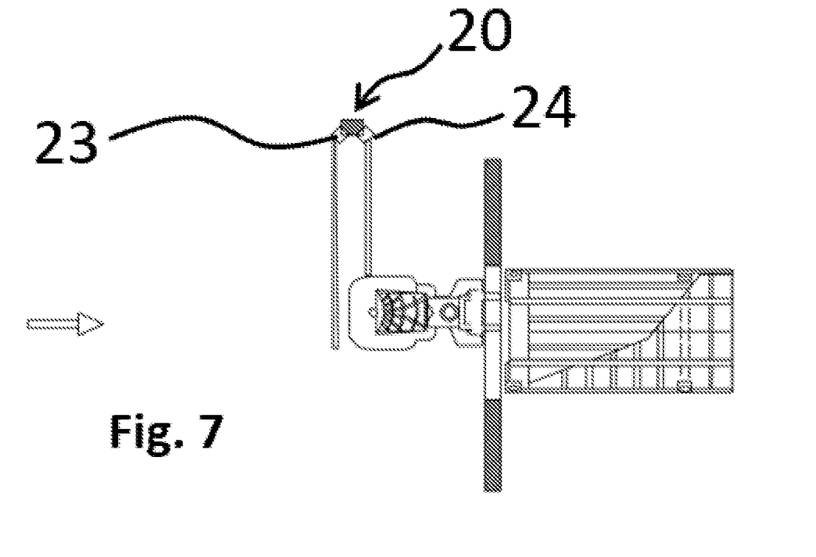
FIG. 7 represents a loading or area transfer step and more particularly the handling machine leaving the truck or the area.

FIG. 7 represents the carriage (handling machine) leaving the truck.

In this figure, the container support is stored in the truck and the handling machine is shown leaving the truck. The detection of the handling machine is performed as follows: detection by the second diffusion sensor 24 then by the first diffusion sensor 23. In this order of detection, there is no photo or film triggering. In other words, when the second diffusion sensor 24 is cut off and then the first diffusion sensor 23, the photo or film capture triggering unit does not capture a photo or film.

Container Support Unloading Mode (Reverse Motion of the Handling System)

In this case, the handling system, and certainly the operator in the case of an electric or manual pallet truck, is detected at first.

The original idea consists in using two additional detection cells sensitive only to reflectors fastened on the handling machine and in calculating the trigger point of the photo or film using these two cells.

FIGS. 8 to 11 represent diagrams of the passage of the container support in front of a terminal 20 of the monitoring system during unloading of the container support. In these figures, the terminal 20, a first diffusion sensor 23, a second diffusion sensor 24, a first reflection sensor 27 and a second reflection sensor 28 are represented.

Figure 8:
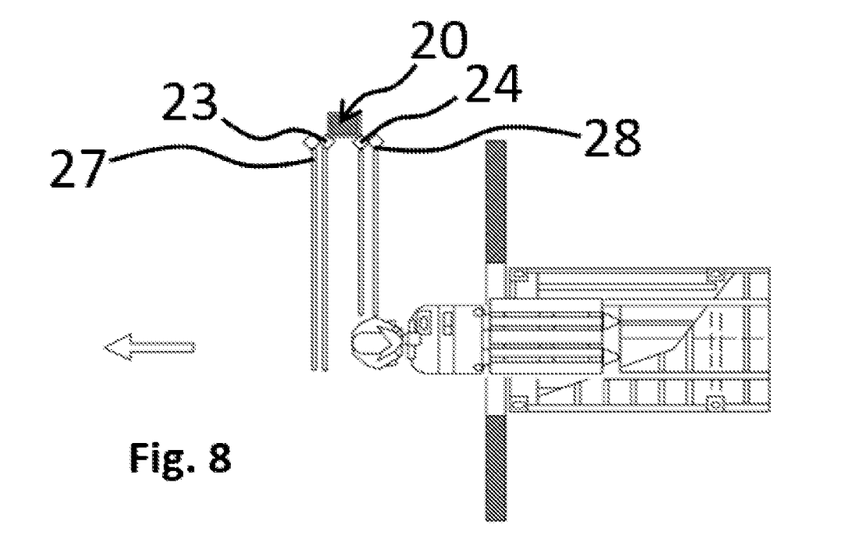
FIG. 8 represents an unloading or area transfer step and more particularly the arrival in front of the identification area and the detection of the operator.

FIG. 8 represents the arrival in front of the identification area and the detection of the operator. In this figure, the container support is unloaded into the truck. The second diffusion sensor 24, as well as the second reflection sensor 28, is cut off. Nonetheless, at this step, the second reflection sensor 28 does not return the reflection information since the reflector is on the handling machine. The operator passes in front of the detection cells without triggering them.

Figure 9:
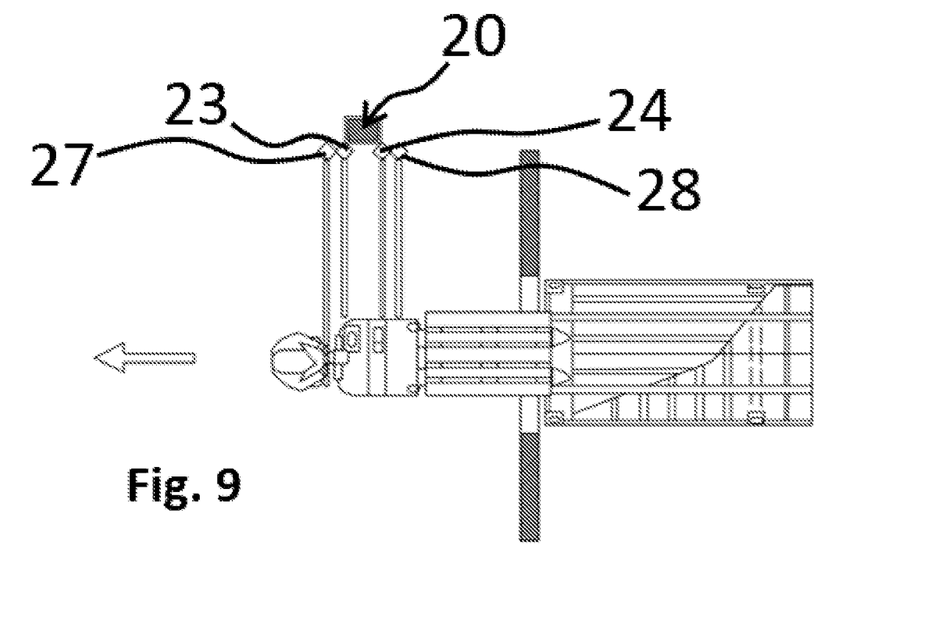
FIG. 9 represents an unloading or area transfer step and more particularly the detection of the handling machine.

FIG. 9 represents the detection of the handling machine. The handling machine is detected by the second reflection sensor 28. In this case, the reflector positioned on the handling machine gives information of the passage in front of the terminal 20. The first reflection sensor 27 is not cut off, there is still no detection of the handling machine. The first diffusion sensor 23 is cut off by the handling machine. The system records the trigger order of the sensors so as to be able to distinguish loading from unloading.

Figure 10:
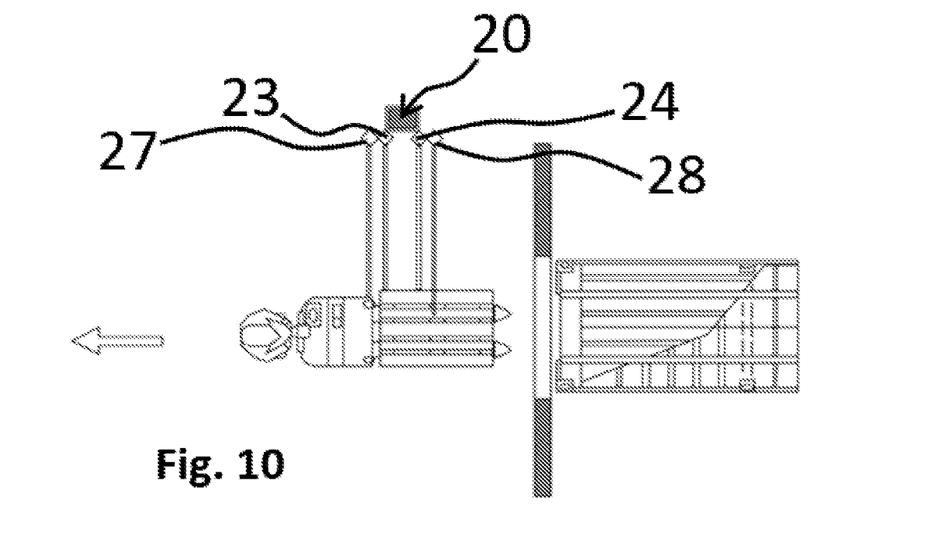
FIG. 10 represents an unloading or area transfer step and more particularly the detection of the handling machine by the first reflection sensor.

FIG. 10 represents the detection of the handling machine by the first reflection sensor 27. The handling machine is detected by the first reflection sensor 27 cooperating with the reflector positioned on the handling machine.

Figure 11:
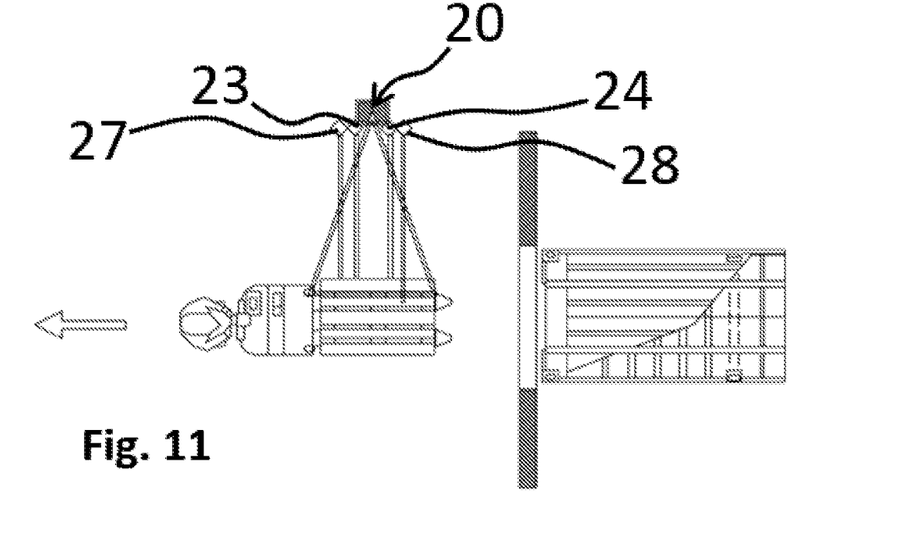
FIG. 11 represents an unloading or area transfer step and more particularly the capture of a photo or film.

FIG. 11 represents the capture of photos or films. The photos or films are captured only if the container support or the container is present. The photo or film capture triggering unit allows capturing photos or films if the second diffusion sensor 24 is cut off or indicates the passage in front of the terminal 20, then the second reflection sensor 28 is cut off or indicates the presence of the container support or of the container, then the first diffusion sensor 23 is cut off or indicates the presence in front of the terminal 20 and finally if the second reflection sensor 28 indicates the presence of the container or container support. The principle of using four detection cells allows automatically detecting whether it consists of loading or unloading and the empty handling machine is never captured in the photo or film.

Volume Measurement During the Passage of a Container or Container Support

The system allows triggering an event upon the passage of a container or a container support, for example during loading or unloading of a truck.

The system comprises depth sensors for volume measurement. These sensors return a matrix of points each containing the distance between the sensor and the potential object.

Figure 12:
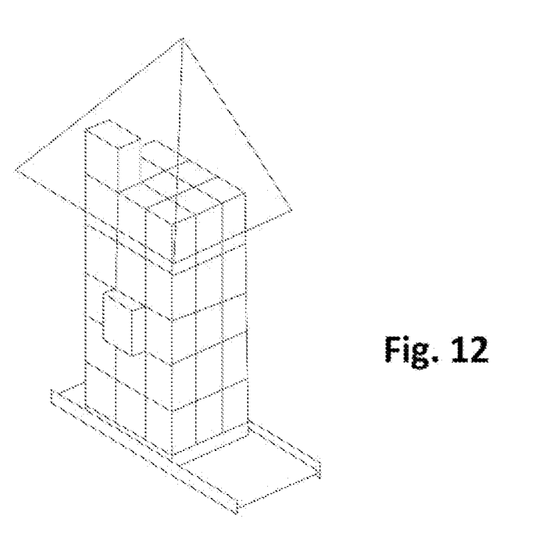
FIG. 12 represents a perspective view of a loading or area transfer on a container support with a depth sensor located above a container support.

FIG. 12 shows the measurement with a depth sensor located above a container support.

This top view allows recovering at least one height distance of the container or of a container support.

Figure 13:
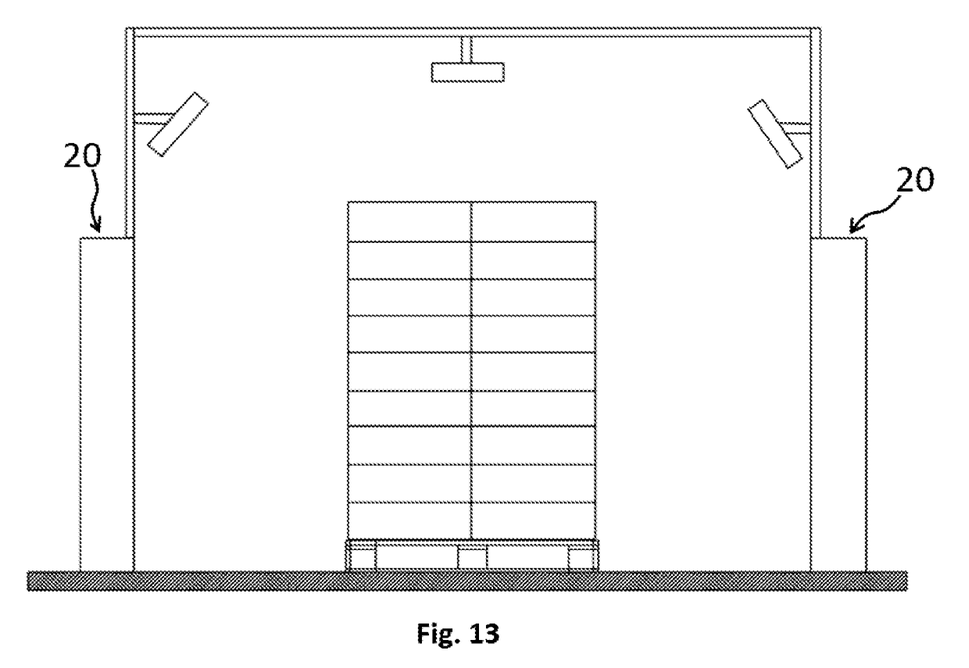
FIG. 13 represents a front view with two terminals of the system and a gantry having three depth sensors.

FIG. 13 shows with a depth sensor located above at least one container and two others on the side in order to obtain an exhaustive measurement of the dimensions of the container or of the container support. The depth sensors being positioned on a gantry above the passage of a container or of the container support. This system allows capturing a photo or a film and measuring the volume of the container or of the container support.

In order to perform an exhaustive measurement by recovering a plurality of lengths and widths, there are two additional depth sensors positioned on each side slightly above each terminal 20. Using a measurement processing algorithm, a microcontroller allows rebuilding a three-dimensional view of the three performed measurements of the container or of the container support and extracting the maximum external dimensions therefrom.

Figure 14:
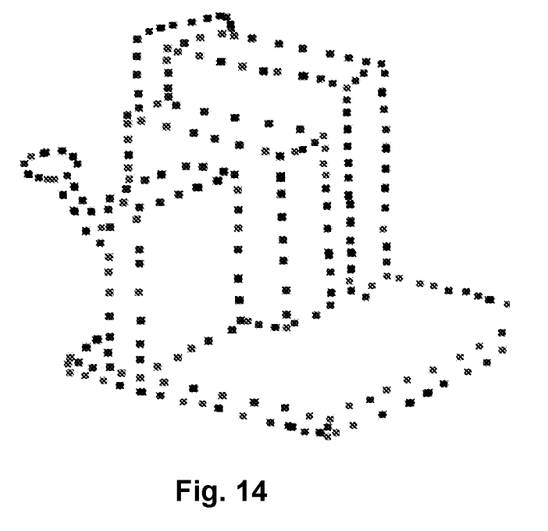
FIG. 14 represents a perspective view according to one viewpoint of the volume of the containers.
Figure 15:
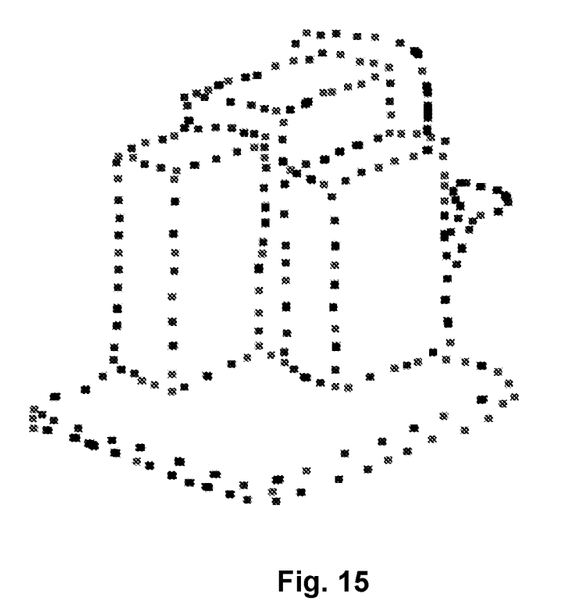
FIG. 15 represents a perspective view according to another viewpoint of the volume of the containers.

FIGS. 14 and 15 show a three-dimensional visualisation from two different angles. These figures show a point cloud representing the measurement performed by the depth sensors. Using the control unit, the volume is deduced from these measurements. The three dimensions height, width and length being extracted from these depth measurements.

In one example, there are several rectangular packets. For each of the packets, the dimensions are deduced and the volume is then calculated by adding the different packets.

In the represented example, the packets are not distinguished on an individual basis, the calculation of the volume is not the resultant of the volume of each packet but an overall measurement.

LIST OF THE REFERENCE SIGNS

TABLE 1

| References | Designations |
|---|---|
| 20 | Terminal |
| 21 | image capturing device |
| 22 | Flash |
| 23 | first diffusion sensor |
| 24 | second diffusion sensor |
| 25 | Screen |
| 26 | passage indicator |
| 27 | first reflection sensor |
| 28 | second reflection sensor |

The invention claimed is:

1. A system to monitor loading and unloading or area transfer of goods, comprising:
   a mobile terminal movable to a position proximate to a point of a passage of the goods, the passage of goods not being controlled by the system, the goods being in containers or on container supports, each container or each container support includes an identification barcode, the mobile terminal comprising:
   an image capturing device, of a video camera or photo camera type, configured to capture a photo or film when at least one container or container support passes in front of the mobile terminal, the mobile terminal extracts and decodes the identification barcode of said at least one container or container support before storing the photo or the film in a database;
   a flash connected to the image capturing device triggered when capturing photos or films; and
   a control unit, comprising a microcontroller to control the system and the database, a processing unit to process the photo or film to identify the identification barcode captured as the photo or film, a triggering unit to trigger a capture of the photo or film as a function of at least:

a first detection cell to detect said at least one container, the first detection cell comprising a first diffusion sensor and a second diffusion sensor indicating a passage in front of the mobile terminal;

a second detection cell comprising a first reflection sensor and a second reflection sensor, cooperating with a reflector positioned on said at least one container or a container support or a device for handling the container support indicating the presence of said at least one container or container support in front of the mobile terminal; and the first detection cell or the second detection cell detecting said at least one container or the container support further determines a direction of the passage of said at least one container or the container support, measures a time between two detections, calculates a speed of the passage of said at least one container or the container support and triggers the capture of the photo or film at a time point of the passage of said at least one container or the container support in front of the mobile terminal.

2. The system of claim 1, wherein the triggering unit captures the photo or film if the first diffusion sensor indicates a presence of the passage in front of the mobile terminal to the control unit, and the second diffusion sensor indicates the passage in front of the mobile terminal to the control unit.

3. The system of claim 1, wherein the triggering unit captures the photo or film if the second diffusion sensor indicates the passage in front of the mobile terminal, the second reflection sensor indicates the presence of said at least one container or container support, the first diffusion sensor indicates the passage in front of the mobile terminal, and the first reflection sensor indicates the presence of said at least one container or container support.

4. The system of claim 1, further comprising at least one system information screen.

5. The system of claim 1, wherein the mobile terminal is located on each side of the point of passage of said at least one container or container support.

6. The system of claim 1, further comprising a first depth sensor, above the point of passage of said at least one container or container support, configured to measure at least one height distance of said at least one container or container support between the first depth sensor and said at least one container or container support.

7. The system of claim 6, further comprising a second depth sensor and a third depth sensor located on either side of the point of passage of said at least one container or container support, the second depth sensor and the third depth sensor being configured to measure at least one lengthwise and widthwise distance of said at least one container or container support between the second sensor and said at least one container or container support, or the third sensor and said at least one container or container support.

8. The system of claim 1, further comprising a communicating terminal comprising an image capturing device and a transmitter to send images captured by the image capturing device of the communicating terminal to the database.

9. The system of claim 1, wherein the image capturing device is configured to capture timestamp information comprising at least a date and a time of the photo or film capture; and wherein the processing unit transmits the timestamp information to the database.

* * * * *